Figure 1:
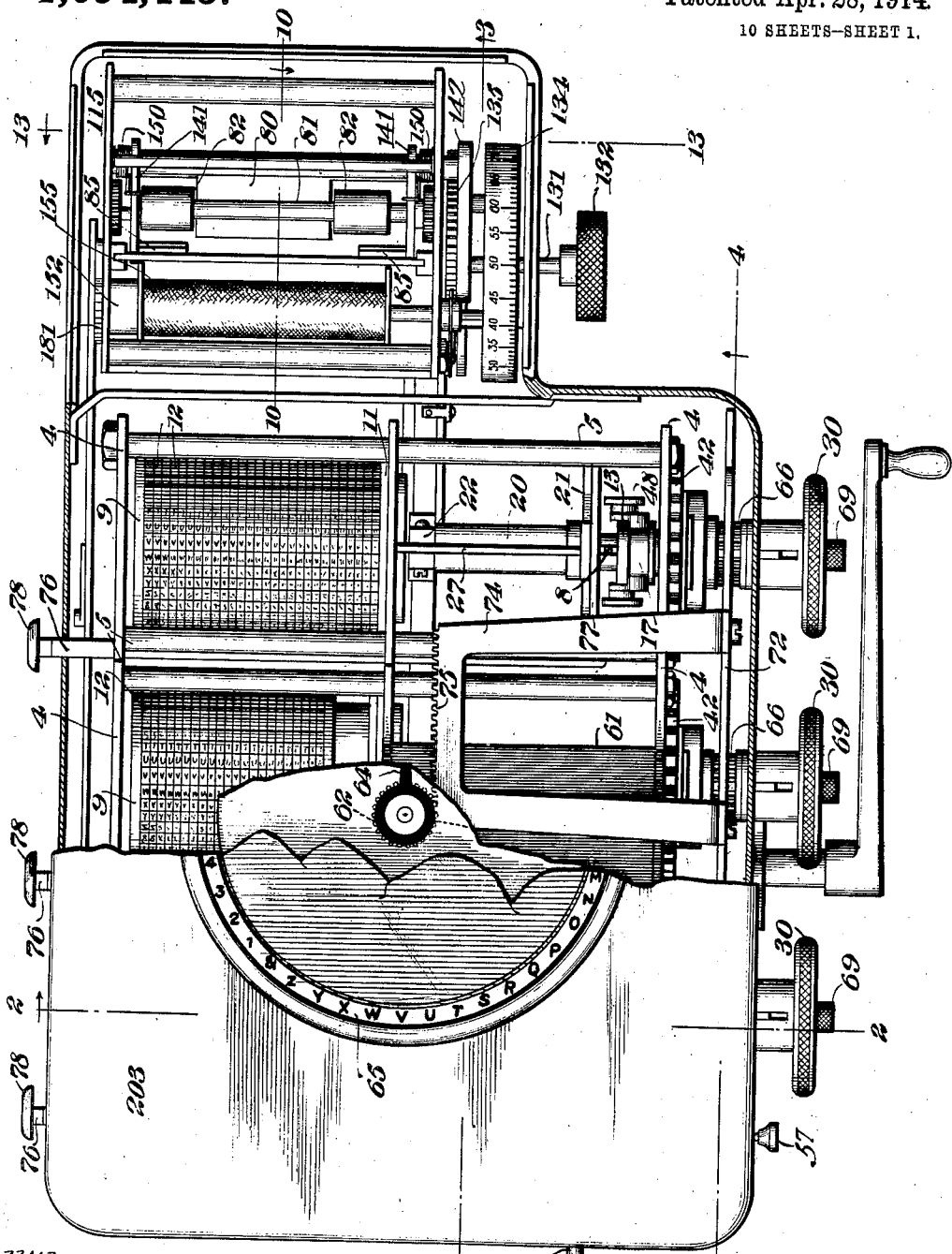

W. G. KIRCHHOFF.
TAG ADDRESSING MACHINE.
APPLICATION FILED SEPT. 24, 1912.

1,094,445.

Patented Apr. 28, 1914.
10 SHEETS—SHEET 1.

Witnesses:
J. Adolph Bishop.
C. S. Butler.

Inventor,
William G. Kirchhoff,
By F. R. Cornwall
Atty.

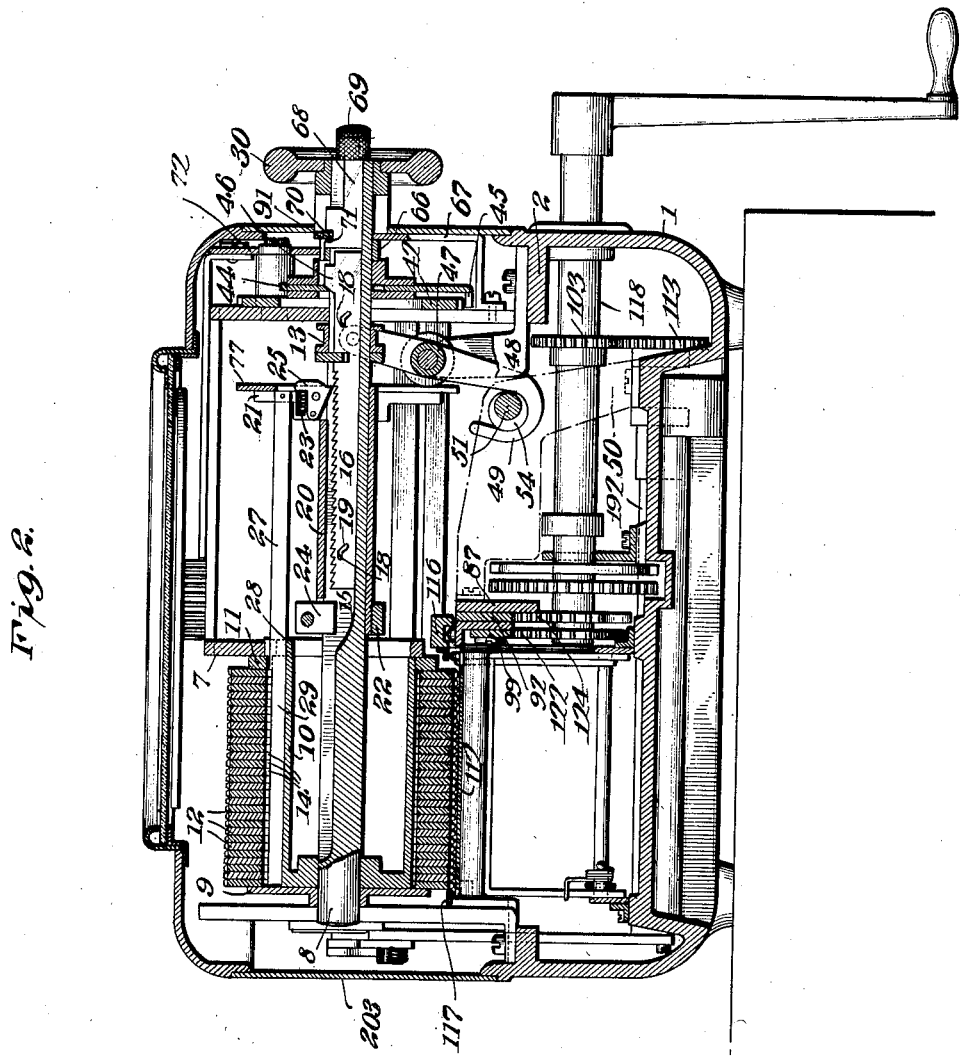

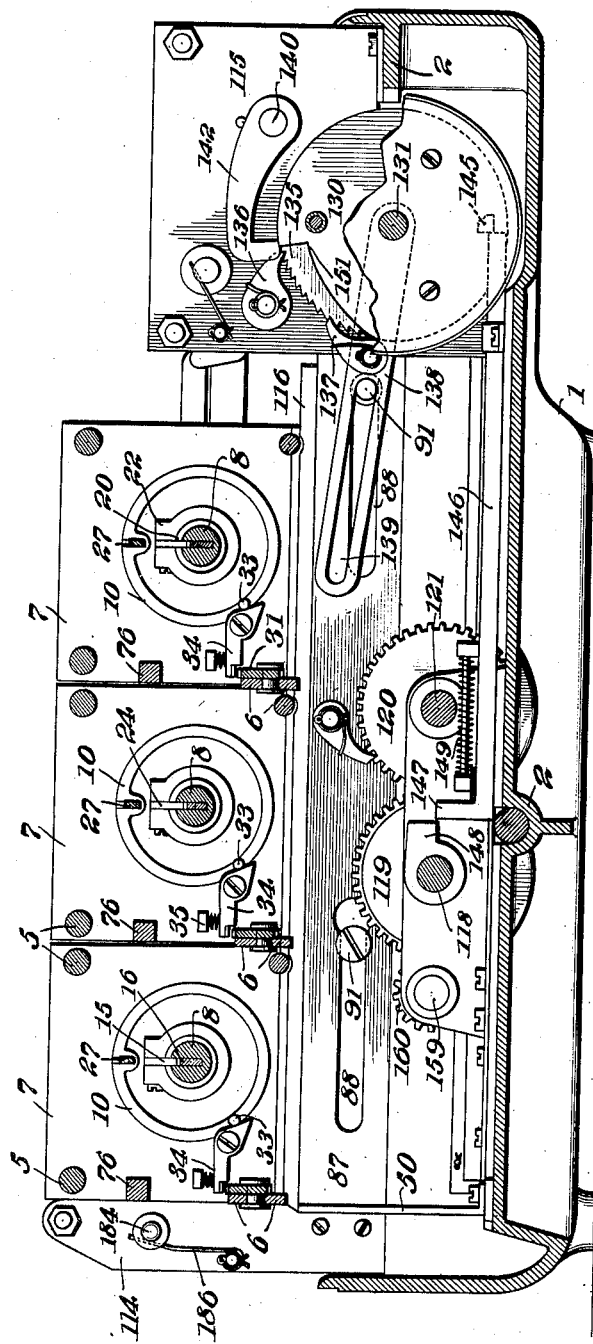

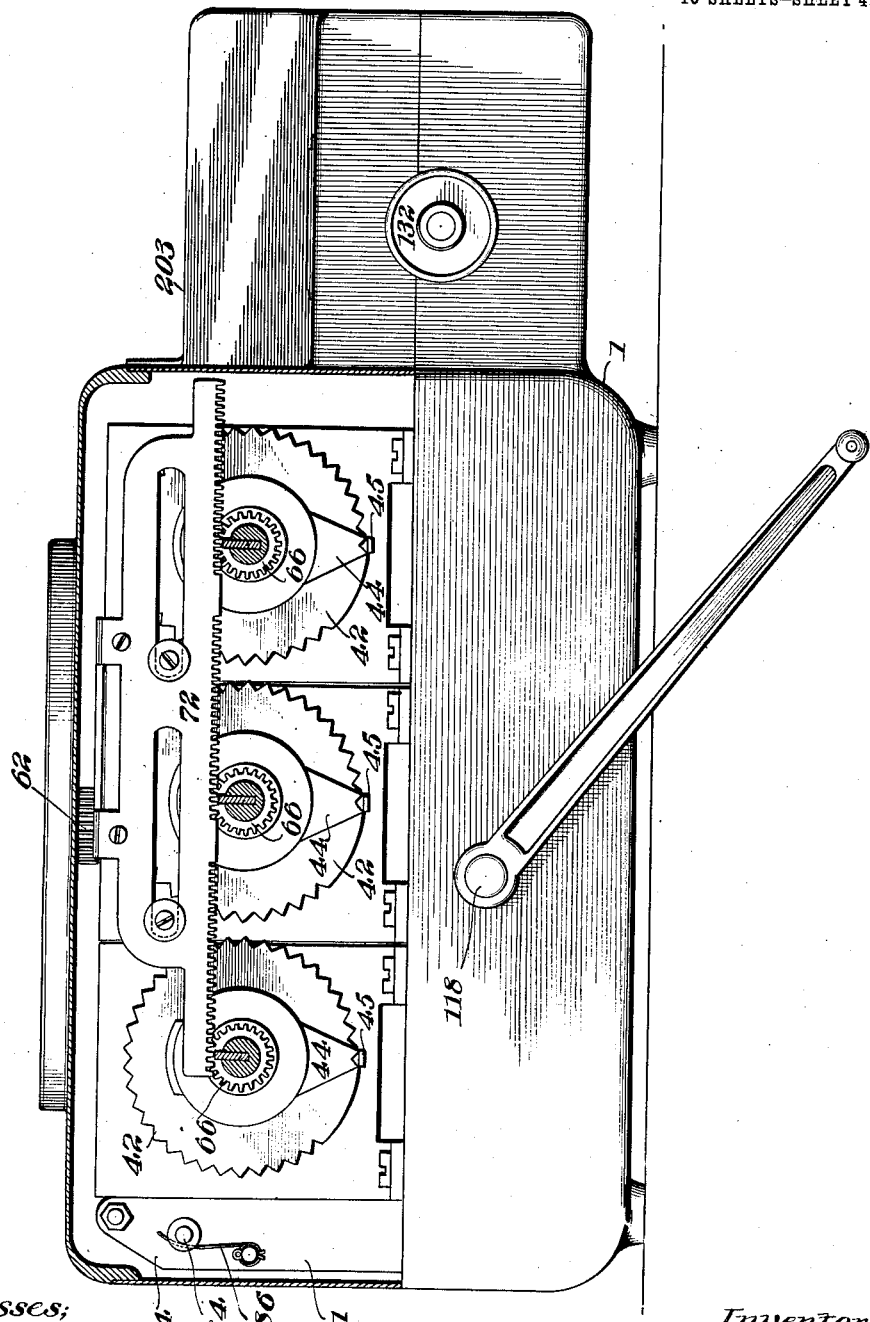

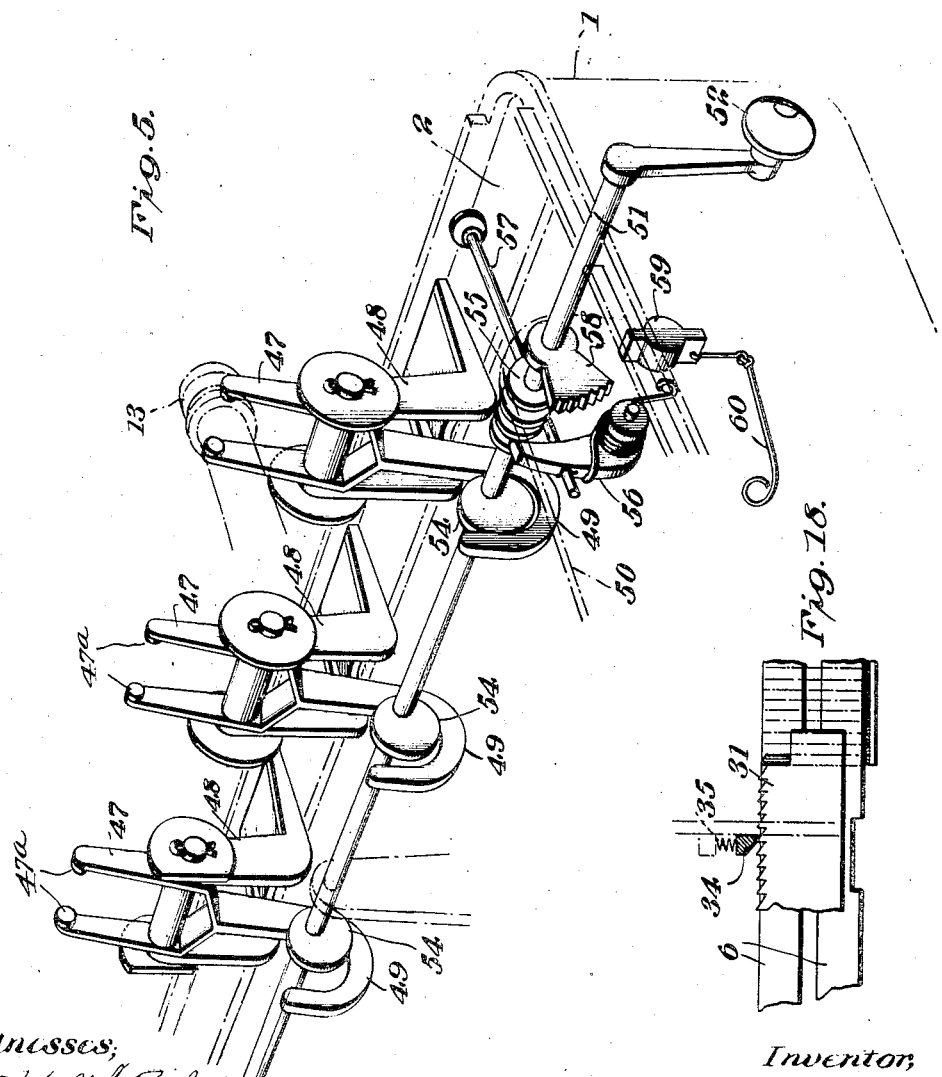

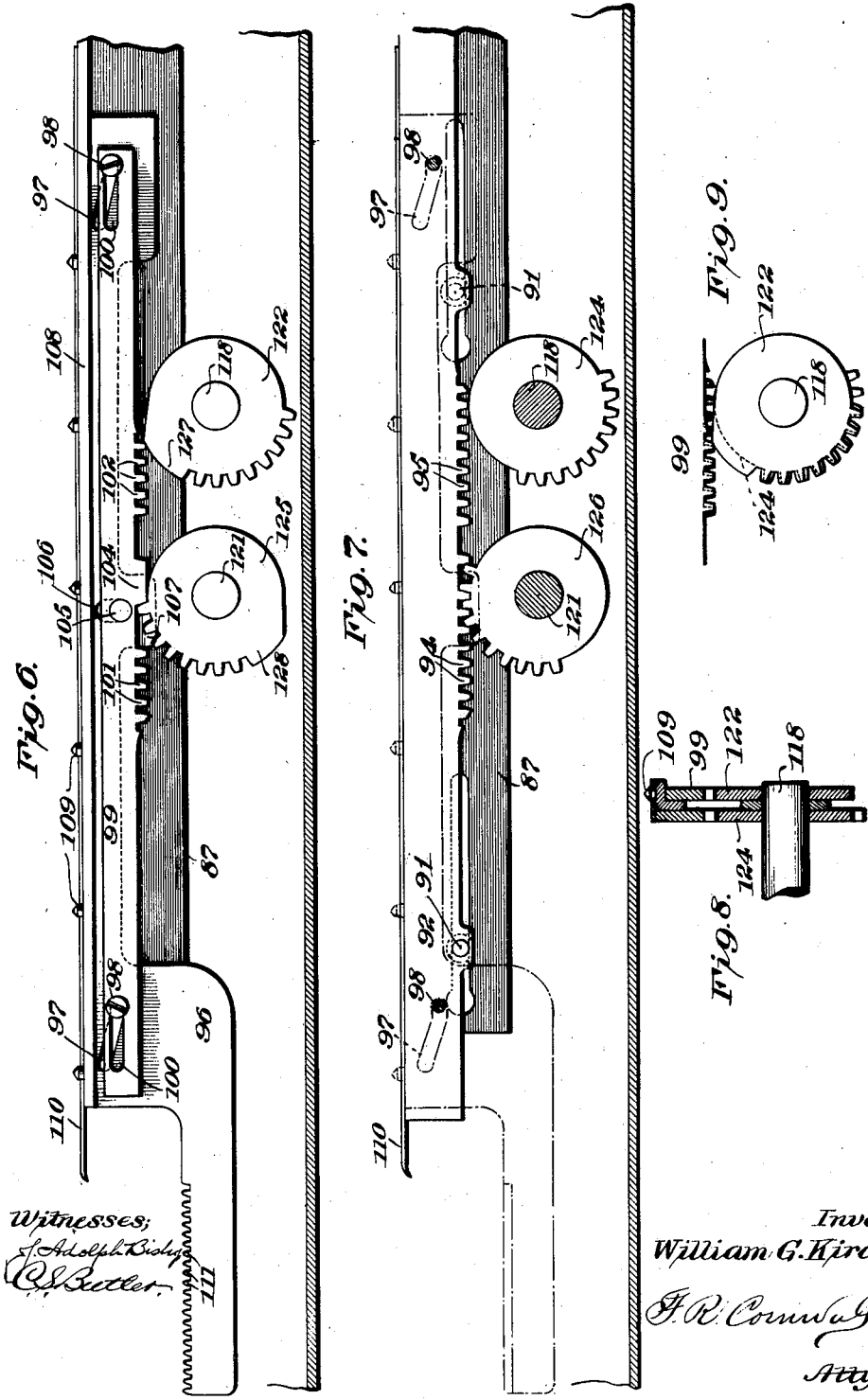

W. G. KIRCHHOFF.
TAG ADDRESSING MACHINE.
APPLICATION FILED SEPT. 24, 1912.
1,094,445.
Patented Apr. 28, 1914.
10 SHEETS—SHEET 7.
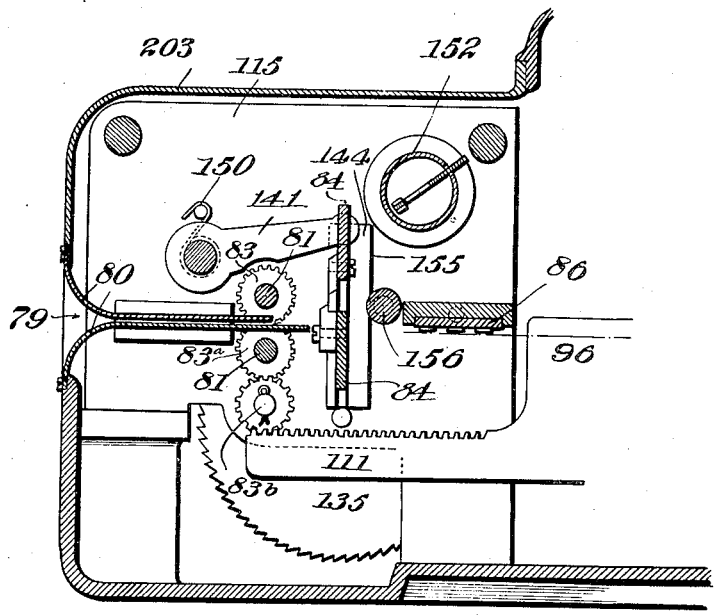
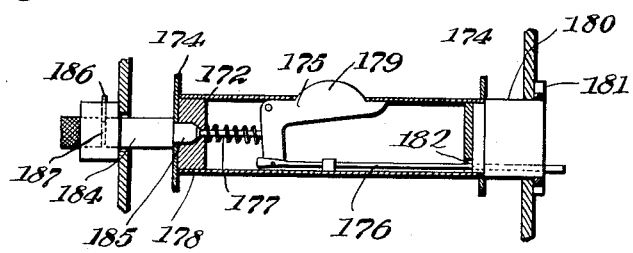
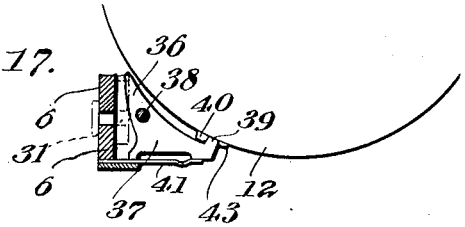
Witnesses:
J. Adolph Bishop
C. S. Butler
Inventor,
William G. Kirchhoff,
F. R. Cornwall
Atty.

W. G. KIRCHHOFF.
TAG ADDRESSING MACHINE.
APPLICATION FILED SEPT. 24, 1912.
1,094,445.
Patented Apr. 28, 1914.
10 SHEETS—SHEET 8.
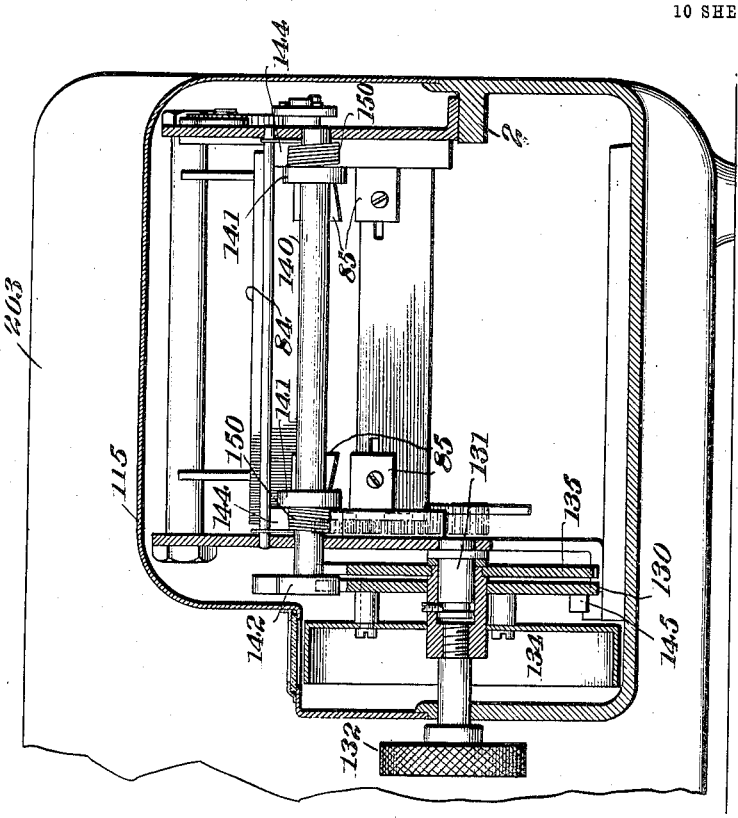

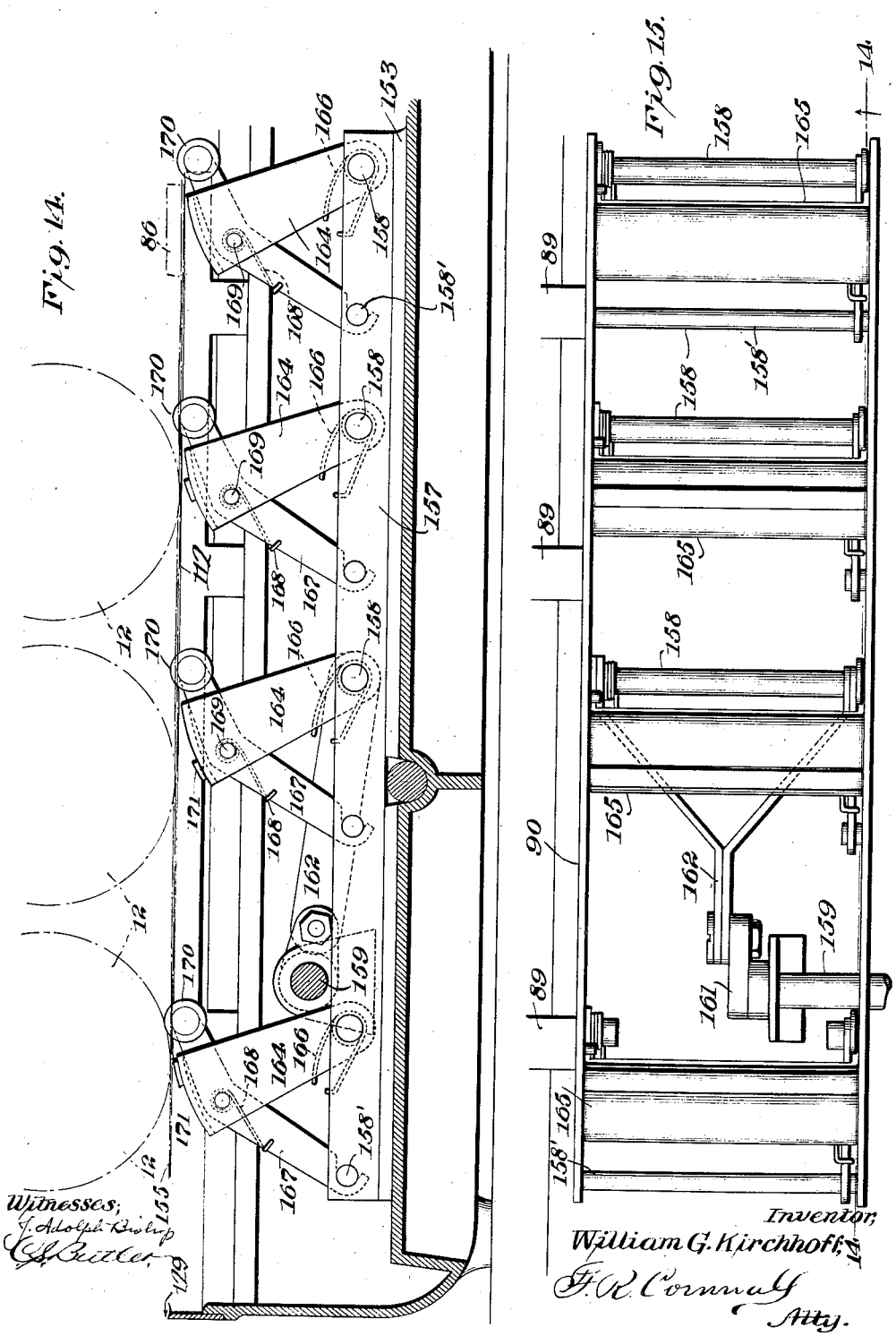

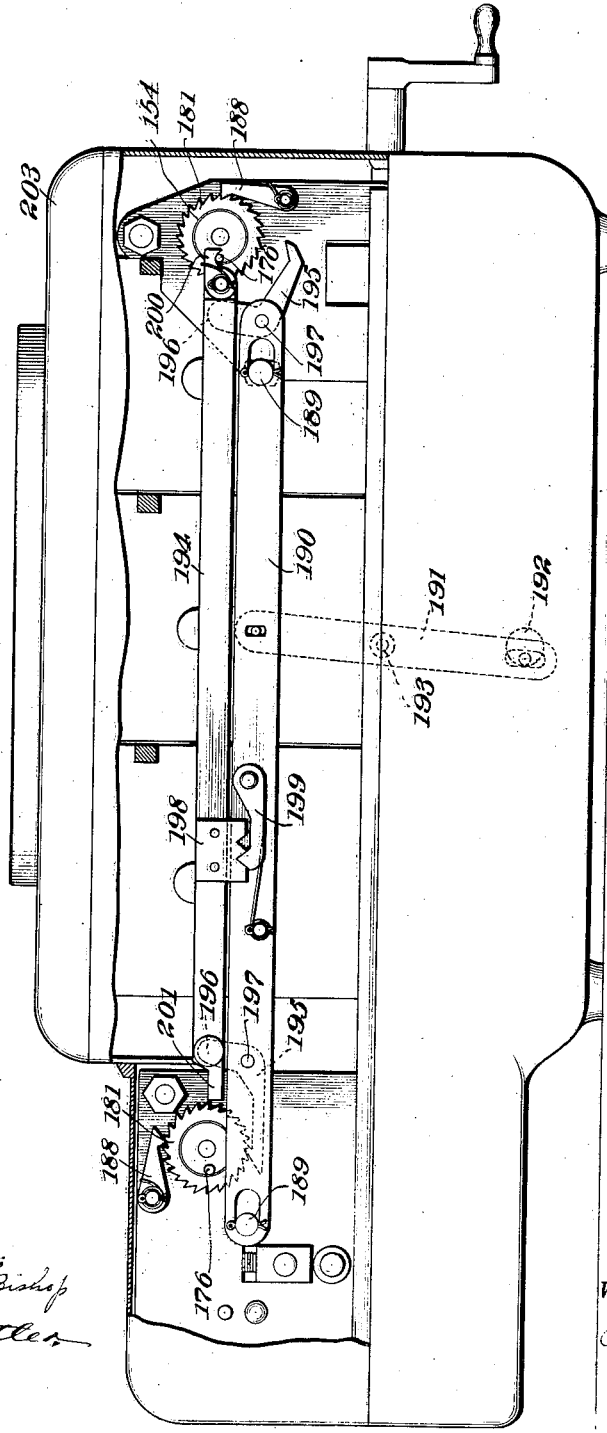

UNITED STATES PATENT OFFICE.

WILLIAM G. KIRCHHOFF, OF ST. LOUIS, MISSOURI, ASSIGNOR TO THEODORE W. REMMERS, OF ST. LOUIS, MISSOURI.

TAG-ADDRESSING MACHINE.

1,094,445. Specification of Letters Patent. Patented Apr. 28, 1914.

Application filed September 24, 1912. Serial No. 722,062.

*To all whom it may concern:*

Be it known that I, WILLIAM G. KIRCHHOFF, a citizen of the United States, residing at St. Louis, Missouri, have invented a certain new and useful Improvement in Tag-Addressing Machines, of which the following is a full, clear, and exact description, such as will enable others skilled in the art to which it appertains to make and use the same, reference being had to the accompanying drawings, forming part of this specification, in which—

Figure 1 is a plan view with part of the casing broken away, the front of the machine being at the bottom of the sheet. Fig. 2 is an elevation in section on line 2—2 of Fig. 1. Fig. 3 is an elevation in section on line 3—3 of Fig. 1. Fig. 4 is an elevation taken on line 4—4 of Fig. 1. Fig. 5 is a perspective view of the setting mechanism. Figs. 6, 7, 8 and 9 are details of the feeding mechanism. Fig. 10 is an elevational section on line 10—10 of Fig. 1. Fig. 11 is a sectional view of one of the ribbon rolls and its mountings. Fig. 12 is a fragmentary elevation on line 3—3 of Fig. 1. Fig. 13 is an elevation on line 13—13 of Fig. 1. Fig. 14 is an elevation on line 14—14 of Fig. 15. Fig. 15 is a plan view of the printing mechanism. Fig. 16 is an elevational view of the ribbon feeding mechanism. Fig. 17 is a detail of the ring locking mechanism. Fig. 18 is a detail of the locking mechanism.

This invention relates broadly to addressing machines, and particularly to a machine adapted to print a uniform legend upon a plurality of attached tags.

The principal object of my invention is to produce a machine which is self-contained and which is provided with means for setting up the characters to be printed anticipatory to the printing of the tags, and means to print therefrom any desired number of tags.

A further object of my invention is to provide a machine wherein a plurality of lines of characters may be set up by manual operation, and whereby the several lines of characters set up may be printed from in sequence upon the tags in lines having proper space relationship.

A further object of my invention is to provide in such a machine, means whereby the machine may be set to print any predetermined number of tags, and means whereby, when said predetermined number has been printed and discharged from the machine, the machine will be automatically stopped.

A further object of my invention is to provide in such a machine, means whereby the type set for a printing operation may be quickly restored to normal or unset position.

A further object of my invention is to provide in such a machine, means whereby a single indicator and a single setting device are adapted to coöperate individually with a plurality of type registers in the operations of setting up type therein.

A further object of my invention is to provide in such a machine, means whereby any one of a plurality of type registers selectively may be thrown into coöperation with said indicating and setting mechanism, and the others of said registers locked out of engagement with the indicating and setting mechanism.

A further object of my invention is to provide in such a machine, means articulated with the printing mechanism whereby a plurality of tags may be fed positively and accurately to the several printing parts.

Another and further object of my invention is to provide in such a machine, an improved ribbon feeding mechanism properly articulated relative to the various operations of the machine.

Other and further objects of my invention will be in part obvious, and in part pointed out by reference to the accompanying drawings, in which like characters of reference indicate like parts throughout.

My invention contemplates the combination of a plurality of type registers provided with means for setting the type to printing position and means for locking it in such position, with a means for feeding a plurality of attached tags intermittently forward to receive successive impressions of the characters set up in the several registers, together with means for effecting a printing operation by the type set up, mechanism for limiting the machine to a predetermined number of operations, and means for feeding an ink carrier to the printing parts.

In the form of my invention illustrated in the drawings, a suitable base frame 1 is provided with a number of suitable flanges 2 which serve as supports for various portions of the mechanism. On certain of said flanges are carried the end frames 4 of the type registers, which are here shown as three in number and will be referred to hereinafter as the first, second and third registers, in their order from the back of the machine, which is the part at the top of the sheet in Fig. 1. The end frames 4 of the type registers are connected at three of their corners by stay bolts 5, and at their other corners by rods 6, which are spaced apart from each other. Carried on the stay bolts 5 of this register, is a medial frame 7, and journaled in the end frames is a hand shaft 8. Journaled at one end in the medial frame 7 and connected at its other end by a disk 9 to the shaft 8 is a barrel 10, which is revoluble with the shaft 8. A ring 11 corresponding to the disk 9 is mounted on the barrel adjacent to the medial frame 7. Carried free upon the barrel 10 is a plurality of type rings 12 which are provided on their peripheries with raised type characters. The said type rings 12 are retained on the barrel 10 by means of the disk 9 at one side and a suitable flange or disk at the other, and normally are held stationary relative to the rotation of the shaft 8 by means hereinafter to be described. In their inner peripheries, the type rings 12 are provided with notches 14 spaced to correspond with the type characters upon the outer peripheries of the rings, there being a notch for each character. The shaft 8 is rabbeted longitudinally as is shown at 15 and in the slot is mounted a toothed rack bar 16. This rack bar is connected at the end removed from the barrel 10 to a collar 13 which is provided with an annular channel 17, and which is adapted to slide upon the shaft 8 so as to reciprocate the rack bar 16 longitudinally. The rack bar 16 is mounted upon pins 18 in the shaft 8, which pins pass through eccentric slots 19 cut in the rack bar 16. By virtue of this arrangement, when the rack bar 16 is reciprocated longitudinally, it will also be reciprocated radially of the shaft, being at its lowest point when the collar 13 is farthest to the right. Mounted upon the shaft 8, as best seen in Fig. 2, is a sleeve 20 which carries at one end a spider 21 and at the other a split collar 22. Carried by the split collar 22 is a key 24 which rides in the continuation of the slot 15 of the shaft 8, thus serving to guide the sleeve 20 and its attached parts in its movement upon the shaft. Carried by the spider 21 is a dog 25 which also rides in the slot 15 and with which the teeth of the rack bar 16 coöperate when the rack bar is in its elevated position. This dog is pressed downward by a spring 23. By virtue of this arrangement of parts, when the collar 13 is moved longitudinally on the shaft, the rack bar 16, by virtue of its slot and pin mounting in the shaft 8 first will be moved a short distance longitudinally of the shaft, then raised so that one of its teeth engages the dog 25, and then moved farther longitudinally of the shaft so as to move the spider toward the barrel.

Mounted upon the spider is a locking bar 27 which is supported on the barrel by a small bracket 28 and which is adapted to move longitudinally through a slot 29 in the barrel. One edge of the locking bar 27 projects outside of the barrel and operates in the notches 14 of the type rings. The longitudinal movement of the rack bar 16 at each actuation thereof is just sufficient to move the locking bar 27 into engagement with one type ring in advance of the just prior position of the end of the locking bar. When thus positioned in the notch of a type ring, it will be seen that the locking bar 27 locks said type ring to the barrel 10, and thereby to the shaft 8, and the peripheral position of the various characters on the set type rings relative to the barrel will be determined by the position of the shaft 8 and locking bar 27 relative to said type rings at the time these parts are locked together. By means of a hand wheel 30, the shaft 8 may be rotated so as to bring the locking bar 27 in alinement with any of the slots 14 of the type rings 12, and by this means the desired characters on the type wheels may be selectively arranged on the printing line.

The position of the shaft 8 during the printing operation is that shown in Figs. 1 and 2 in which the locking bar 27 is at its highest point, and in which the printing line is on the lowest line across the peripheries of the type rings. In the operation of setting up a line of type, therefore, the shaft 8 is rotated so as to bring the locking bar 27 into alinement with the notch in the first type ring which will cause the first ring 12 to be positioned with the desired character on the printing line when said ring is locked to the shaft 8 and the shaft positioned in the normal printing position. After the shaft 8 has thus been positioned relative to the desired character, let us say "A", on the first type ring, and the type ring locked to the shaft by the locking bar 27, the shaft 8 is then rotated so as to bring it in position relative to the desired character on the second type ring, so that the desired character, say "B", on the second ring is positioned on the same line with the character "A" on the first ring. These characters are thus alined by virtue of the fact that the first type wheel is rotated with the shaft and the set character positioned on the line with the desired character on the second ring. The second ring is then locked so as to move with the shaft by a further inward thrust of the locking bar 27. Then, say it is desired to set up the next character as "C", the shaft 8 is rotated so as to bring the selected characters on the first two rings which are locked to the shaft on a line with "C" on the third ring and the third ring is locked in. In this fashion, it will be seen that successive characters are arranged on the printing line by positioning characters already set on said line on a line with the desired character on the next adjacent type ring, and then locking said last ring to the other rings and the shaft. After each inward thrust with the locking bar 27 by the rack bar 16, the rack bar is retracted to normal position which is that shown in Fig. 2; but the locking bar is left in its forward position in the slot 29, the teeth of the rack bar 16 escaping under the dog 25 on the retracting movement.

As is best illustrated in Figs. 17 and 18, a locking mechanism is provided for locking the locking bar in its forward position. This locking mechanism consists of a rack bar 31 which is slidably mounted on the rods 6 and which is yoked to the spider 21 by a toe bracket, so as to be moved longitudinally with the movement of the spider, but permitting the spider to rotate independently of it. Upon the medial frame 7 is mounted a dog 34 which is spring pressed into engagement with the teeth of the rack bar 31 by the spring 35. When in engagement with the rack bar, the dog 34 prevents retrograde movement of said bar, and by virtue of the connection of the bar with the spider, retrograde movement of the latter is thus prevented, and the locking bar 27 thus held in its forward position. A lug 33 on the barrel 10 is adapted to contact with a rear end of the dog 34 to rock it out of engagement with the rack bar 31 to permit the latter to be moved back when it is desired to restore the type to unset position. The means for restoring the spider 21 to its extreme right hand position and thus retracting the locking bar 27 to unlock the rings, consists of a push rod 76 which is slotted at its inner end to receive the edge of the peripheral disk 77 of the spider. On the end which projects out of the casing the rod 76 is provided with a hand knob 78. The operation of retracting the locking bar 27 to unlock the rings is accomplished by rotating the shaft to the position in which the lug 33 on the barrel disengages the dog 34 from the rack 31, and then thrusting inwardly the rod 76, whereby the spider 21 is pushed to the right and the locking bar 27 withdrawn.

The rack bar 31 is beveled at its forward end and in its forward progress is adapted to engage behind rearwardly extending arms 36 of a series of locking pawls 37 which are mounted upon a shaft 38 fixed in the end frame 4 and medial frame 7. There is one of these locking pawls 37 for each type ring 12 and each pawl is provided on its forward arm with a lug 39 which is adapted to engage a lug 40 on its corresponding type ring. The pawls 37 are pressed toward the type rings by leaf springs 41, and when in engagement with the lugs on the type rings lock the rings against rotation in their normal unset positions. As the rack bar 31, however, moves forward with the spider 21, by virtue of its engagement successively with the rear arms 36 of the locking pawls, it rocks said pawls successively out of engagement with the type rings, thus permitting said unlocked rings to be rotated with the shaft 8 when they have been locked thereto by the means above described. Said pawls are held in their rocked positions by said rack bar 31 and are thus retained clear of the type faces on the set rings. A means for centering the locking bar 27 relative to the notches in the type rings 12 is provided and will be best understood by reference to Figs. 2 and 4. This centering mechanism includes a notched disk 42 which is mounted upon the end frame 4 concentric with the shaft 8 and having the indents in its periphery spaced circumferentially to correspond with the normal positions of the notches of the type rings 12 relative to the frame. Carried upon the shaft 8, so as to revolve therewith, but adapted to reciprocate diametrically thereof, is a swinging arm 44 which is provided with a centering wedge 45 adapted to coöperate with the indents of the notched disk 42. The centering wedge is normally held out of engagement with disk 42, and is adapted to be forced into engagement therewith by the action of a cam 46 which is carried on the outer end of the rack bar 16. The arrangement is such that when the rack bar 16 is pushed forward to project the locking bar 27 into a notch of one of the type rings, the cam 46 forces the centering wedge 45 into one of the indents of the notched disk, which movement rectifies any overthrow or underthrow of the shaft 8, and centers the locking bar 27 relative to the notch of the type disk so as to insure its registering accurately therewith. Upon the retraction of the rack bar 16, the cam is moved out of engagement with the swinging arm 44 and permits the centering wedge to disengage from the toothed disk so as to permit the shaft 8 to be rotated. The means for returning the rings to normal unset position is best illustrated in Fig. 17 and comprises a rule 43 which is connected to the disk 9 and the ring 11 so as to be revoluble with the shaft 8. When the locking bar 27 has been withdrawn from the type rings, rotation of the shaft 8 will cause the rule 43 to sweep around the peripheries of the type rings and engage the lugs 40 on the type rings and carry the type rings around to normal position.

By reference to Figs. 2 and 5, there may be seen the means provided for the reciprocation of the collars 13, from which collars the rack bars 16, and all parts actuated thereby are moved. This mechanism includes a swinging yoke 47 for each of the registers. Each of these yokes is pivoted in a bracket 48 which is supported on one of the flanges 2. Each yoke comprises an upper bifurcated portion, upon each prong of which is a trunnion 47$^a$, which trunnions engage in the annular channel 17 of the collar 13. Below the axis on which it is pivoted, the yoke 47 is formed with a depending hook shaped arm 49 which has its edge within the hooked portion finished to a bearing surface. Upon brackets 50, which are supported on the base frame, is journaled a setting shaft 51 provided at one end, which extends through the base frame, with a crank 52. Upon the setting shaft 51 is a plurality of eccentrics 54, one for each of the swinging yokes 47. These eccentrics are sized to register in the hook shaped bearings of the swinging yokes, so that when the setting shaft 51 is revolved, the eccentrics 54 will swing the swinging yokes 47 and reciprocate the collars 13. As it is desirable to set up type in but a single register at a time, the eccentrics 54 are arranged on the shaft 51 so that only one of said eccentrics can be engaged with its corresponding yoke 47 at a time. To provide for the selective engagement of any one of the eccentrics 54 with its swinging yoke, the shaft 51 is slidable longitudinally in its bearings. As a means for locking the shaft 51 in any one of its longitudinal positions, said shaft has pinned to it an annularly grooved spool 55. A spring pressed locking member 56 is adapted to register with any one of the several annular grooves in the spool 55. This locking mechanism is manually operated by the thrust pin 57 which forces it out of engagement with said annular grooves, so as to permit the shaft 51 to be shifted longitudinally to bring any desired eccentric 54 into engagement with its swinging yoke. When the shaft 51 is thus positioned, the locking member 56 is allowed to spring back into the groove in register with it, in which position shifting of the shaft 51 is prevented, and the selected eccentric and swinging yoke maintained in engagement. For the purpose of insuring a complete reciprocation of the collars 13 by the shaft 51, there is provided on said shaft a toothed segment 58. Pivoted on the frame adjacent to said segment is a two-way pawl 59, whose action is controlled by the spring 60. During the revolution of the shaft 51, the said pawl 59 escapes across the teeth of the segment 58, but engages with them in such relationship as to prevent reverse rotation of the shaft 51 until the toothed segment has swept completely beyond the pawl.

By reference to Figs. 1, 2 and 4, may be understood the indicating mechanism and the manner in which any one of the registers selectively may be thrown into coöperation with it for the purpose of regulating the setting of type in the selected register. As appears most plainly in Fig. 1, it will be seen that the second register frame is provided with a plate 61 upon which is mounted a cog-wheel 62. To the cog-wheel 62 is fixed a suitable pointer 64 which is adapted to be rotated relative to an index 65, said pointer and said index, of course, being visible from the outside of the machine. Upon each of the shafts 8, there is a pinion 66 which is normally free to rotate thereon. A bracket 67, through which passes the shaft 8, retains the pinion in position longitudinally on the shaft. In the slotted end of the shaft 8, is a sliding key 68 which is movable longitudinally by means of a knurled head 69. The key 68 is provided with a ward 70 which is adapted to receive the bracket 67 when the key is pushed in to engage in a slot in the pinion 66. In this position, the shaft 8 is free to rotate in the bracket 67 and the pinion 66 is locked to rotate with the shaft. When the key is pulled outwardly, it registers in a notch 71 in the bracket. In this position, the shaft 8 is locked against rotation in the bracket 67 and the pinion 66 is free to rotate on the shaft. With its teeth meshing with all of the pinions is a rack 72 which has a horizontal extension 74 provided with a toothed edge 75 which meshes with the cog-wheel 62. By virtue of this gearing, when one of the pinions 66 is rotated by its shaft 8, it will rotate the indicator 64, and the two are so articulated relative to the printing line of the type register and the index 65, that the indicator 64 will indicate on the index the character which the selected shaft 8 is positioned to set on the printing line.

It will be understood that during the process of setting type in one of the registers, the key 68 of that register is pushed in to lock its pinion 66 to its shaft, while the keys on the other registers are pulled out to render their pinions 66 free from such shafts, so that they may be moved by the movement of the rack 72 without necessitating movement of their shafts.

The feeding mechanism for feeding the tags to the printing operations will next be described and will be best understood by reference to Figs. 6 to 13 inclusive. At the extreme rear of the machine, the casing is provided with a slot 79 which is fitted with guiding aprons 80 which extend inwardly between roller shafts 81 which carry coöperating rollers 82 at their extremities, which rollers are adapted to receive between them the edges of the strip of tags to feed the same forward between them. The shafts 81 are rotated by means of pinions 83, 83$^a$ and 83ᵇ which are driven by the toothed portion 111 of the feeding bar 96, which travels forwardly in engagement with pinion 83ᵇ and rearwardly out of engagement therewith. Forward of the feeding rollers 82 is a pair of blades 84 provided at their extremities with cutting members 85, which cutting members are adapted to act upon the lateral portions of the tag strip which normally are uncut. Forward of the knives is positioned a fixed plate 86 provided with raised characters, usually the name of the shipper or some similar legend which is to be printed on all the tags. Supported by brackets 50 is an inner rail 87 provided with slots 88, and supported by brackets 89 is a corresponding outer rail 90. Slidably mounted on the inner rail 87 by means of wrist pins 91 is an outer rack bar 92 having a rear set of teeth 94 and a front set of teeth 95 on its lower edge. Mounted on said outer rack bar is the feeding bar 96 having inclined slots 97 engaging on pins 98 carried by the outer rack bar. On the other side of the feeding bar 96 is the inner rack bar 99. This bar is carried on the pins 98, but is shiftable longitudinally thereon relative both to the outer rack bar 92 and the feeding bar 96, by virtue of the slotted mountings 100. The inner rack bar is provided with a rear set of teeth 101, a front set of teeth 102, and a medial lug 104. A pin 105 is carried by the inner rack bar and passes through a vertical slot 106 in the feeding bar 96 so that bars 96 and 99 may have relative vertical movement, but move together longitudinally. Feeding bar 96 is formed with a depending medial drop 107 under the slot 106 and has its upper edge 108 turned over horizontally to extend across the top of the inner rack bar 99. Upon the turned-over portion of the feeding bar 96 are disposed pins 109 which are spaced from one another to correspond with the spacing of the holes in the strip of attached tags. A cover plate 110 is disposed over the inner rack bar and secured to the inner rail 87. The rear extremity of the feeding bar is dropped down and provided with a toothed portion 111. Between the inner rack bar 99 and the outer rail 90 is stretched a web 112 which is secured in the front frame 114 and the rear frame 115. Adjacent to the inner edge of the web, and over the turned-over portion 108 of the feeding bar is disposed a retaining strip 116, and mounted on the outer rail is an outer retaining strip 117. These retaining strips are spaced apart a proper distance to engage over the lateral edges of the tag strip when it is fed over the web.

The means for operating the feeding mechanism includes the main shaft 118 which is provided with a pinion 119 meshing with a similar pinion 120 on a counter shaft 121. Upon the inner end of the main shaft 118 is a mutilated gear 122 which is adapted to coöperate with the front set of teeth 102 of the inner rack bar 99, and spaced slightly apart from said mutilated gear 122 is an outer mutilated gear 124 which is adapted to coöperate with the front set of teeth 95 of the outer rack bar 92. Similarly upon the inner end of the counter shaft 121 is a mutilated gear 125 adapted to coöperate with the rear set of teeth 101 of the inner rack bar 99, and spaced slightly apart from said mutilated gear 125 is an outer mutilated gear 126 which is adapted to coöperate with the rear set of teeth 94 of the outer rack bar 92. The direction of rotation of the main shaft 118 and its attached gears as shown in Figs. 6, 7 and 8 is counter-clockwise, while the direction of rotation of the countershaft 121 and its attached gears, as shown in said figures, is clockwise. At the beginning of an operation, the wrist pins 98 are in the extreme rearward ends of the slots 97. In this position, the feeding bar 96 stands at its lowest position relative to the rack bars, and the outer rack bar 92 stands at its rearmost position relative to the feeding bar 96 and the inner rack bar 99. In such position, the teeth of the outer mutilated pinion 124 have just passed out of mesh with the teeth 95 of the outer rack bar 92 and the cam member 127 will be in engagement with the rack bar 99 to prevent longitudinal movement of the parts. Rotation of the main shaft 118 will cause pinion 126 to come into mesh with the teeth 94, and as this pinion is revolving in the direction toward the front of the machine the rack bar 92 will be moved forwardly. This initial movement of rack bar 92 causes pins 98 to ride in slots 97 and lift feeding bar 96. During this movement of wrist pins 98 through slots 97, feeding bar 96 and rack bar 99 are held against longitudinal movement by the engagement of cam member 127 with rack bar 99. Feeding bar 96 lifts vertically until pins 98 reach the front extremities of slots 97, whereupon feeding bar 96 is moved forwardly with the rack bar 99 by the engagement of the teeth of gear 125 first with lug 104 and then with teeth 101. When rack bar 99 has reached the limit of its forward movement, the operation just described will be repeated inversely. After gear 125 has transmitted rack bar 99, cam member 128 engages said bar and holds it against longitudinal movement, while pinion 124 moves rack bar 92 rearwardly in the slots 100 of bar 99 and slots 97 of feeding bar 96. This movement lowers feeding bar 96, whereupon gear 122 engages first the lug 104 and then teeth 102 to transmit bars 99 and 96 rearwardly. Thus it will be seen that feeding bar 96 moves rearwardly in its lower position and forwardly in its higher position. This effects the feeding operation of the tag strip.

as feeding bar 96 is transmitted rearwardly below the strip, raised until the pins 109 engage the holes in the strip, and then transmitted forwardly carrying the strip with it. In this feeding operation, the tag strip is fed forward over the web 112, being held down against the web by the lateral retaining strips 116 and 117. A discharge slot 129 is provided in the front of the casing and through it the strip is fed out of the machine.

As best shown in Figs. 3, 10, 12 and 13, a controlling mechanism is provided which may be set to feed a predetermined number of tags to the machine, and to automatically stop the machine when the predetermined number of tags has been discharged from the machine. This mechanism includes a cam 130 which is mounted upon a stub shaft 131, which shaft may be rotated toward the back of the machine by the hand wheel 132. An indicator disk 134 is also mounted upon the shaft 131 so as to be rotated with the cam 130. A ratchet wheel 135 is mounted upon the shaft 131 and with it coöperates pawl 136 which is mounted upon rear end frame 115. Ratchet wheel 135 is pushed to be rearwardly rotated by the dog 137 which is carried upon an oscillating link 138. The link 138 is pivoted on the shaft 131 below the line of the slot 88, and said link is provided with a slot 139 in which operates an extension on the wrist pin 91. Thus it will be seen that as wrist pin 91 is reciprocated with the outer rack bar 92, the link 138 will be oscillated to feed the dog 137 step by step to the ratchet wheel 135 and rotate the latter. Mounted in the rear end frame 115 is a shaft 140 which carries spring pressed arms 141 fixedly mounted thereon, and the controlling arm 142 which coöperates with cam 130. The upper blade 84 is pivotally mounted upon the arms 141 and operates at its extremities in the vertical guideways 144. A lug 145 is mounted upon the cam 130 in position to coöperate with the rear end of the sliding rod 146. The sliding rod 146 is provided at its forward end with a block 147 which is adapted to engage beneath a lug 148 on the main shaft 118 when sliding rod 146 is pushed forwardly by the lug 145. The sliding rod 146 is normally retained in its rearward position by the extension spring 149. The form of the cam 130 is such as to normally hold the controlling arm 142 elevated, whereby the upper blade 84 is held elevated against the tension of the springs 150. The cam 130 is provided, however, with a mutilated portion 151 which permits the controlling arm 142 to drop, and thus permits the upper blade 84 to drop and sever the connected portions of the tag strip with its cutting members 85. The point at which this operation takes place is designated on the indicator 134 as a zero point.

There will be five tags in the machine between the blade and the discharge slot when this operation takes place, and as it is necessary that these five tags be discharged from the machine before it is stopped, the relation of the lug 145 to the mutilated portion 151 and the rod 146 is such as will permit five revolutions of the main shaft 118 before it is stopped by the engagement of block 147 and lug 148. It will be seen, therefore, that the number of operations which can be effected before the machine is stopped is dependent upon the position of the mutilated portion 151 of the cam 130 relative to the controlling arm 142. The indicator 134, therefore, is graduated so as to indicate, as the cam is set by the hand wheel 132, the number of operations which will be permitted. In this fashion, the exact number of tags to be printed by the machine is definitely predetermined. Upon spools 152 and 154 mounted respectively in the rear and front end frames is wound an inked ribbon 155. By means of guiding rollers 156 the ribbon is guided between the web 112 and the type rings in the registers. The relation of the ribbon to the type rings is best illustrated in Fig. 14, although the web is not shown in this figure, the same having been removed to illustrate the operation of other parts. The tag strip is fed between the web 112 and the ribbon 155 with the side upon which the printing is to be done next to the ribbon and in position to be forced by the printing mechanism against the type set up in the registers.

The printing mechanism may be understood best by reference to Figs. 2, 14 and 15. Mounted to slide on bearing plates 153 are lower frame members 157 which are connected by bolts 158 and 158′. A countershaft 159 is rotated from the main shaft 118 by a pinion 160. The shaft 159 carries the crank 161 which is pivotally connected to one of the bolts 158 by the connecting yoke 162 so that as the shaft 159 is rotated, the frame members 157 will be reciprocated longitudinally. Upon bolts 158 are pivotally mounted arms 164 which carry platens 165. The arms 164 are spring pressed rearwardly by springs 166 and may be locked in forward position by locking levers 167 which engage suitable pins in the frame members 157 under the influence of springs 168. Each locking lever 167 is pivoted to one of the inner series of arms 164 at 169 and carries on one arm a roller 170 which extends above the web 112. Upon the platens 165 are provided raised portions 171 which are adapted to coöperate with the web below the line of type on the printing line of the registers. When there are no tags in the machine, the platens will be reciprocated back and forth with the sliding frames 157 and the rollers 170 will travel freely along the edge of web 112, extending above the same, but when there are tags in the machine, the arms 164 will be unlocked by the tags bearing upon the rollers 170 to prevent their levers 167 rising to elevated position, and this will disengage the locking levers 167 from the pins. When thus disengaged, only the lower ends of the frames 164 will be reciprocated, and the platens 165 will be simply rocked against web 112. During this rocking operation, the tag strip will be fed forward while the raised portions 171 are rocked away from the web, and when the tag strip is stationary the raised portions 171 will be rocked up against the web and carry it upwardly to force the tag strip against the ribbon and the type on the printing lines. In this fashion the printing operation is effected. The relative positions of the type registers and the platens 165 are such that the tags will be printed on different lines from the successive type registers.

The mechanism for feeding the ribbon will next be described and will be best understood by reference to Figs. 11 and 16. The spools 152 and 154 are formed with hollow shafts 172 and heads 174. In the shaft is pivoted a lever 175 which is connected to a slidable pin 176 which projects through one of the heads 174. The lever 175 is spring pressed by extension spring 177 which bears against the pin seat 178, so as to normally hold the slidable pin 176 projected, but the same may be drawn inward by pressure upon a projecting portion 179 of the lever 175. The mountings for a spool comprise a drum 180 which is revolubly mounted in one side of the end frame and which carries on the outside of the end frame a ratchet wheel 181. The drum and ratchet wheel are provided with a passage 182 which is adapted to receive the slidable pin 176. The mounting at the other side consists of a shiftable pin 184 provided with a head 185 which is adapted to register in a seat in the spool head 174. The shiftable pin 184 is retained in its inner position by the spring 186 which engages in a notch 187 in the pin. Upon the end frames are detents 188 which engage the ratchet wheels 181 to hold them against overthrow, but which permit them to escape in either direction. Upon pins 189 is mounted a link 190 which is adapted to be reciprocated by a lever 191 which is pivoted at 193 and actuated from a shaft 192 operated from the the main shaft by gears 103 and 113. A shiftable link 194 is mounted upon link 190 by means of the dogs 195 which have their rear arms pivoted to the shiftable link at 196 and which are pivoted at their fulcrum points to the link 190 at 197. A notched block 198 is carried by the shiftable link 194 and a detent 199 carried by the link 190 is adapted to coöperate therewith to hold the shiftable link 194 in adjusted position longitudinally relative to the link 190. Upon the end of the shiftable link 194 is a pawl 200 which is adapted to coöperate with the end of the sliding pin 176 when it is projected beyond the face of the ratchet 181. Upon the rear end of the shiftable link 194 is a projection 201 which is adapted to coöperate in a similar fashion with the projecting end of pin 176 on the rear spool. When the shiftable link 194 is shifted forward on the link 190 by virtue of the pivotal connections of the dogs 195, the detent 199 will engage the rear notch in the block 198, and the rear dog 195 will be in engagement with the rear ratchet wheel 181 so as to wind the ribbon on to the rear spool. The ribbon will be reeled on to the rear spool and off of the front spool until it is all unwound from the latter, when the lever 175 being no longer held in its inward position by the ribbon, will spring out forcing the end of the pin 176 of the front spool beyond the face of the front ratchet wheel 181. Upon the rotation of the front ratchet wheel 181 to a proper position, the projecting end of the pin 176 will engage the front end of the pawl 200 and shift the shiftable link 194 forward upon the link 190. This will cause the front dog 195 to engage the front ratchet wheel 181 and the rear dog 195 to be disengaged from the rear ratchet wheel 181. In this arrangement the reciprocation of link 190 will wind the ribbon on to the front spool. Thus it will be seen that the ribbon feed is automatically shifted from one spool to the other as the ribbon becomes unwound from a spool.

My device is completely inclosed in a casing 203 which effectively covers all portions so as to exclude all foreign matter.

I do not claim in this application the inventions relating to the feeding mechanism illustrated in Figs. 6, 7, 8 and 9, or the ribbon feeding mechanism, these inventions being the subject matter of my divisional and copending application No. 743,180, filed January 20, 1913, for web feeding mechanism, and my Patent No. 1,061,753, dated May 13, 1913, for feeding mechanism, the application for which was filed January 20, 1913.

While a single embodiment of my invention is above described and illustrated in the drawings, I am aware that changes in construction and disposal of parts may be made whereby to adapt the invention to divers forms and various uses. Therefore, it is not my intention that my invention be limited to the single form described and illustrated, but that it includes all forms which may be made by obvious changes.

I do not claim in this application the subject matter of the feeding mechanism illustrated in Figs. 6, 7, 8 and 9, or the ribbon feed mechanism illustrated in Fig. 16, these inventions being claimed in my copending applications numbered 743,179, for feeding mechanism, and 743,180, for web feeding mechanism, both filed January 20, 1913.

What I claim is:

1. In a device of the class described, in combination, a frame, a plurality of registers mounted on said frame, type carried by said registers, means in each register for positioning said type, means in each register for securing said type in position, and means common to all of said registers adapted to operate selectively the type securing means of any one of said registers.

2. In a device of the class described, in combination, a plurality of type registers adapted to print on different lines and including movable type and means for positioning said type, an indicator, and means for throwing said indicator into coöperation with the type positioning means of any of said registers.

3. In a device of the class described, a type register comprising in combination, a frame, a plurality of type carrying members normally held against movement in said frame, an adjustable member, means for freeing said members from said frame, means for locking them to said adjustable member, and means for securing said adjustable member in printing position.

4. In a device of the class described, a type register comprising in combination, a frame, an adjustable member mounted therein, a plurality of adjustable type carrying elements normally secured against movement in said frame, means for freeing said elements successively from said frame, means for locking them to said adjustable member, means for adjusting such elements as are locked in the adjustable member relative to the other elements, and means for returning said elements to normal position.

5. In a device of the class described, a type register comprising in combination, a frame, an adjustable member mounted in said frame, a plurality of rings having type on their peripheries carried free on said adjustable member and normally secured against movement in said frame, means for successively freeing said rings from said frame and means for locking them successively to said adjustable member to move therewith in opposite directions.

6. In a device of the class described, the combination of a plurality of type rings having type on their peripheries, a member adjustable relative thereto, means for locking said rings to said adjustable member, and an indicator coöperating with said adjustable member to indicate the position thereof relative to the type on the rings free from said adjustable member.

7. In a device of the class described, a type register comprising in combination, a frame, a revoluble member mounted in said frame, a plurality of type rings mounted free upon said revoluble member, said rings being provided with a plurality of notches, and a locking bar carried by said revoluble member and adapted to engage in the notches of said rings.

8. In a device of the class described, a type register comprising in combination, a frame, a revoluble member mounted in said frame, a plurality of contiguously disposed rings mounted in said frame, said rings being provided with type on their outer peripheries and notches in their inner peripheries corresponding with said type, a locking bar carried by said revoluble member adapted to engage in said notches, means for positioning said locking bar selectively in said notches, and means for retracting said bar from said notches.

9. In a device of the class described, a type register comprising in combination, a frame, a revoluble member mounted in said frame, a plurality of type rings mounted in said frame, said rings being provided with notches, a locking bar carried by said revoluble member and adapted to engage in said notches, means for adjusting said revoluble member relative to said rings, and means for centering said locking bar relative to said notches.

10. In a device of the class described, a type register comprising in combination, a frame, a plurality of type rings mounted in said frame, a shaft adjustable relative to said rings, a locking bar for securing said rings to said shaft, and a reciprocating rack bar carried by said shaft and adapted to position said locking bar relative to said type rings.

11. In a device of the class described, a type register comprising in combination, a frame, a plurality of type rings mounted in said frame, a revoluble shaft mounted in said frame, a sleeve slidably mounted upon said shaft, a locking bar movable with said sleeve and adapted to engage said type rings, a rack bar carried by said shaft and adapted to move said locking bar into engagement with said type rings, and means for reciprocating said rack bar.

12. In a device of the class described, in combination, a plurality of type registers including type setting mechanism, a swinging yoke coöperating with the type setting mechanism of each register, a shaft, and means for selectively engaging said shaft with any one of said swinging yokes.

13. In a device of the class described, in combination, a plurality of type carrying members, means for adjusting said members, means for locking said members in adjusted position, a shaft for operating said locking mechanism, and means operating to preclude the reverse operation of said shaft before the completion of an operation of said locking mechanism.

14. In a device of the class described, a printing mechanism comprising in combination, a printing face, a web adjacent said face, a reciprocating frame, a platen carried by said frame, and means for rocking said platen against said web to force said web toward the printing face, said platen having a raised portion adapted to coöperate with the web over the area of the printing face.

15. In a device of the class described, a printing mechanism comprising in combination, a printing face, a constantly reciprocating frame, a rocking platen actuated by said frame and adapted to coöperate with said printing face, means for locking said platen out of coöperation with said printing face, and means for releasing said platen to permit it to coöperate with said printing face when material is fed thereto.

16. In a device of the class described, the combination of a printing face, a web adapted to coöperate therewith, means for feeding a strip between said web and said printing face, a rocking plate adapted to force the strip against the printing face, means for locking said rocking plate in inoperative position, and means operable by the strip for releasing said rocking plate.

17. In a device of the class described, the combination of a plurality of type registers arranged to print on different lines and including movable type and means for positioning said type, and an indicator adapted to coöperate selectively with any one of said registers.

18. In a device of the class described, a plurality of type registers including movable type, an adjustable member for each register, means for locking the type of said registers to their associated adjustable members, and an indicator adapted to coöperate selectively with any one of said adjustable members to indicate its position relative to its associated type.

19. In a device of the class described, a plurality of registers containing type, a movable shaft in each register, means for locking the type of each register to its shaft, an indicator, and means for articulating said indicator with any one of said shafts to indicate the position of said shaft relative to its associated type.

20. In a device of the class described, the combination of a plurality of registers containing movable type, a shaft in each register, means for locking the type of each register to its associated shaft, a pinion mounted free upon each shaft, means for locking each of said pinions to its shaft, an indicator, a rack bar operatively connecting all of said pinions to said indicator, and means whereby said shafts may be manually actuated.

21. In a device of the class described, a register made up of rings having type arranged peripherally thereon, a movable shaft coöperating with said rings, a spider mounted to rotate with said shaft but movable longitudinally thereon, a locking means normally coöperating with each of said type rings, means carried by said spider adapted to lock said rings successively to said shaft, means operable by said spider adapted to successively unlock said rings from their normal locked position, a reciprocating rack bar adapted to move said spider to effect simultaneously the operations of unlocking said rings from their normal locked position and locking them to the shaft.

22. In a device of the class described, the combination of adjustable type rings, a frame in which they are mounted, locking means normally locking the rings against movement in said frame, an adjustable member operable to successively free said rings from said locking means, a rack bar, means for reciprocating the same, means operable by said rack bar for advancing said adjustable member to unlock said rings, and means coöperating with said adjustable member to prevent its being retracted.

23. In a device of the class described, the combination of a plurality of type registers containing adjustable type, an adjustable member in each register, locking means in each register for securing the type thereof to the associated adjustable member, and a manually operable means adapted to coöperate selectively with the locking means in any one of said registers to operate the same.

24. In a device of the class described, a plurality of registers containing adjustable type, means associated with the type of each register normally locking it in position, an unlocking means associated with each register and adapted to free the type thereof from its normal locked condition, and a manually operable means adapted to coöperate selectively with the unlocking means of any one of said registers to unlock the type of said register.

25. In a device of the class described, a register including movable type, an adjustable shaft, a movable spider adapted to rotate with the shaft, a locking means for said type operable by said spider, an unlocking means for said type operable by said spider, and means for advancing said spider to effect simultaneously locking and unlocking operations upon said type.

26. In a device of the class described, a printing mechanism comprising the combination of a printing face, a reciprocating frame, a flexible web, an oscillating platen carried by said frame and adapted to have rocking coöperation with said web and force said web toward said printing face, and means for locking said platen to said frame to reciprocate therewith without having rocking coöperation with said web.

27. In a device of the class described, a printing mechanism comprising the combination of a printing face, a reciprocating frame, a support for material for receiving printing impressions, a rocking platen pivoted on said frame and operable thereby, and a locking lever coöperating with said platen and said frame and adapted to lock said platen against rocking movement on said frame.

28. In a device of the class described, a printing mechanism comprising the combination of a plurality of printing faces, a support for material to be printed upon, a separate platen adapted to coöperate with each printing face in the printing operation, means for locking each platen in inoperative position, means for feeding material to be printed upon between said platens and said printing faces, and means operable by said material for successively releasing said platens to permit their coöperating with said printing faces.

29. In a device of the class described, a type register including adjustable type, an adjustable member, means for locking said type to said adjustable member, means for unlocking said type from said adjustable member, and means preventing the operation of said last mentioned means while said adjustable member is in other than printing position.

30. In a device of the class described, a type register comprising the combination of a frame, adjustable type normally locked in position in said frame, an adjustable member, means for selectively locking said type to said adjustable member to move therewith, means for unlocking said type from said adjustable member, and means operable by said adjustable member for returning said type to normal position.

31. In a printing machine, the combination of a printing face, a reciprocating frame, a platen pivoted on said frame and adapted to be oscillated by movement of said frame so as to have rocking coöperation with said printing face, means operable by the movement of said frame for locking said platen against oscillation and out of coöperation with said printing face, and means operable by material to be printed upon adapted to release said platen when so locked.

32. In a device of the class described, a printing register including the combination of a plurality of type rings arranged in series, a shaft adjustable relative thereto, a member carried by said shaft and adapted to engage said rings progressively in their serial order to lock a plurality thereof to said shaft for rotary motion therewith, and means for advancing said member to engage successive rings.

In testimony whereof I hereunto affix my signature in the presence of two witnesses, this 4th day of September, 1912.

WILLIAM G. KIRCHHOFF.

Witnesses:
M. P. SMITH,
C. S. BUTLER.